United States Patent [19]
Teodorescu et al.

[11] 3,815,487
[45] June 11, 1974

[54] PROCESS AND DEVICE FOR GASO-DYNAMIC VENTILATION

[75] Inventors: Constantin G. Teodorescu; Constantin Octavian Ceauselu; Sorin Ioanitescu, all of Bucharest, Romania

[73] Assignee: Institutul Pentru Creatie Stiintifica Si Technica-Increst, Bucharest, Romania

[22] Filed: Oct. 12, 1972

[21] Appl. No.: 296,933

[30] Foreign Application Priority Data
Mar. 21, 1972 Romania.............................. 70211

[52] U.S. Cl.................................... 98/43, 417/198
[51] Int. Cl................................................. F24f 7/06
[58] Field of Search ........ 98/43, 58, 33 R; 417/177, 417/187, 198, 151

[56] References Cited
UNITED STATES PATENTS

| | | | |
|---|---|---|---|
| 1,982,128 | 11/1934 | Vetrano | 417/198 |
| 2,172,522 | 9/1939 | Sline | 417/198 X |
| 2,684,621 | 7/1954 | Cook | 98/43 |
| 3,302,547 | 2/1967 | Wasserman | 98/43 X |
| 3,330,379 | 7/1967 | Cook | 98/43 X |
| 3,337,121 | 8/1967 | Coanda | 417/198 X |

*Primary Examiner*—William E. Wayner
*Attorney, Agent, or Firm*—Karl F. Ross; Herbert Dubno

[57] ABSTRACT

The invention relates to a process and device for ventilation and air conditioning, which operate by steam or compressed air ejection. The process performs the entrainment and mixing of the air as a secondary fluid with the primary fluid by creating a depression in the primary fluid, introduced under pressure into an annular chamber; the primary fluid expands through an annular slot, between two axially confronting surfaces; due to the Coanda effect, the emergent flow adheres pellicularly to a closed surface with a curved profile, located downstream of the slot. The device includes a Coanda ejector of the outer type fastened to a support; the device includes a cylindrical body in which the annular chamber is located. The cylindrical body is connected by a screw thread to the curved profile body of revolution; between the two bodies is arranged the adjustable slot. The ejector is disposed in a cylindrical tube with a layer of acoustic insulation having an air-inlet at the upstream end and obturation means with flaps at the downstream end from the ejector.

2 Claims, 3 Drawing Figures

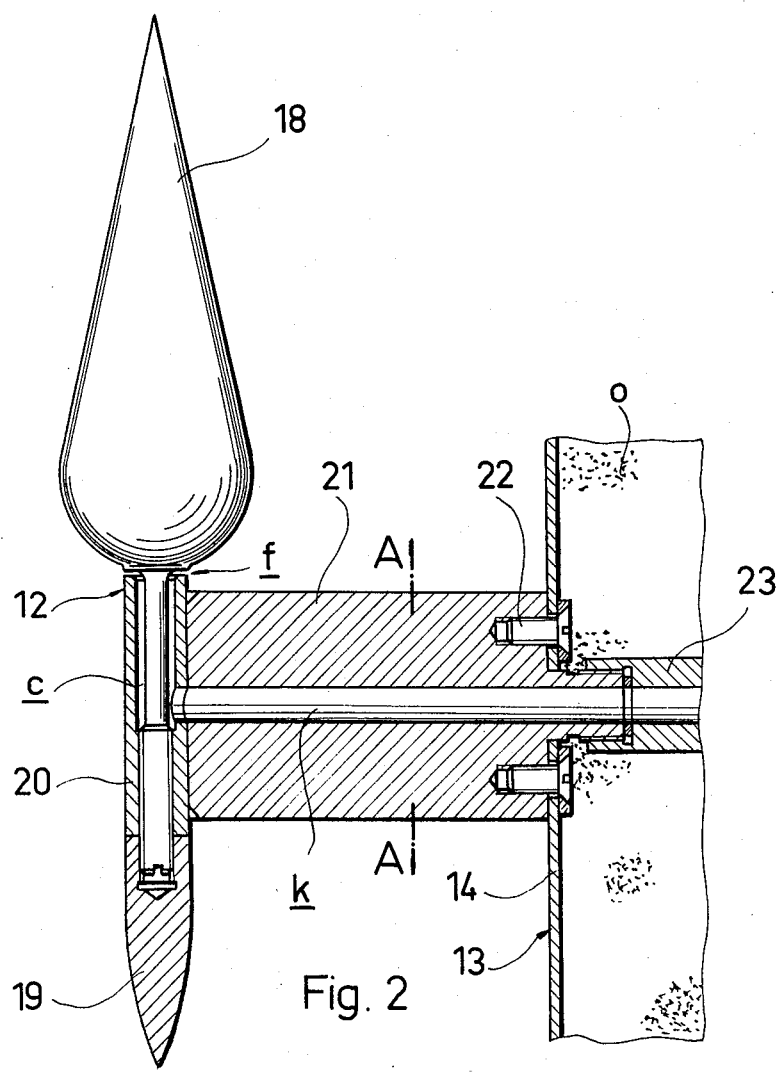
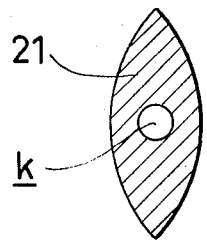

PROCESS AND DEVICE FOR GASO-DYNAMIC VENTILATION

The present invention relates to a process and a ventilation device based on the COANDA effect to serve for ventilation and air conditioning in industrial buildings, rooms, mines, etc., using steam or compressed air as the primary fluid.

Ventilation devices are known with electrical ventilators.

The electrical ventilators are rotating machines and are differentiated, according to the flow of the fluid they entrain, in to two basic types: axial and centrifugal.

The axial ventilators have an axle with paddles, which rotate in a housing and entrain a fluid stream parallel to the axis of the rotor. The driving motor being installed in the interior of the same housing, diminishes the flow cross-section. The centrifugal ventilators have an axle on which a disk with radial paddles is mounted within a housing, entraining the fluid mass between the paddles under the effect of the centrifugal forces. With this type of ventilator, the fluid stream enters axially, being then subjected to a change of direction by 90° and evacuated radially.

The use of electric ventilators has the following drawbacks:

the need for periodic maintenance because of the wear of the rotating parts;

large overall dimensions;

considerable noise generated by the rotating parts and by the air admission into the rotor;

limited utilization in corrosive and explosive environment; and high cost price due to the constructive complexity.

There are also known ventilation devices using conventional ejectors.

The usual ejector is a device producing a fluid jet which serves to entrain another fluid by depression and friction.

Depending on the speed, the classical ejectors may be subsonic or supersonic.

Ejectors with supersonic speeds consist of two convergent-divergent nozzles in which sonic speeds are developed in the minimal sections, both in the entraining fluid and in the entrained mixture.

An ejector with subsonic speeds consists of a convergent nozzle for the primary fluid and of a mixing chamber and a convergent-divergent nozzle for the mixture. Throughout their passage through the nozzle, the fluids nowhere reach the speed of the sound. The main drawback of classical ejectors is due to the fact that the entrained fluid mass is comparatively small, which fact is illustrated by the low ejection coefficients (the relation between the weight of the entrained fluid and that of the entraining one).

The process, according to the invention, eliminates the above mentioned drawbacks, in that it employs, to achieve very large outputs of secondary air, a Coanda nozzle, the outer type mounted in the interior of a tube, whose walls are provided with adequate acoustic insulation; the primary fluid is introduced under pressure into an annular feeding chamber which it traverses axially, expands through a slot between confronting surfaces of a cylinder body that contains the annular feeding chamber and of a profiled body, and adheres by the Coanda effect to the surface of the profiled body in form of a pellicular jet. This creates a strong depression, which gives rise to an entrainment by means of induction of the secondary fluid from the space where the ejector is placed; the latter fluid mixes with the primary fluid and is discharged into the atmosphere, thus leading to the ventilation of the space in which the device is provided.

The device comprises a tube provided with a sound-absorbent layer, which is flared at the inlet to which a profiled screen is attached, the tube being provided internally with a Coanda ejector of the outer type consisting of a support of lenticular profile, to which a cylindrical body is fastened; a profiled body is threaded on this cylindrical body and a feeding chamber is defined in the interstice between the inner surface of the cylindrical body and the rod of the profiled body. The feeding chamber communicates, by means of a channel with the source of working fluid, while the variation of the rate of working fluid is obtained by modifying the width of the slot between the profiled body and the cylindrical body by rotating the profiled body to screw it further into the cylindrical body. The adjusted slot width is maintained in by screwing, on the threaded end of the rod of the profiled body, an aerodynamically profiled piece that fulfils the function of a palnut, the tube being provided at the other end with an obturating device with adjustable flaps.

The invention will best be understood by reference to the accompanying drawing in which:

FIG. 2 is a detail of the ejector; and

FIG. 3 is a cross-section through the lenticular support.

Figure 1:
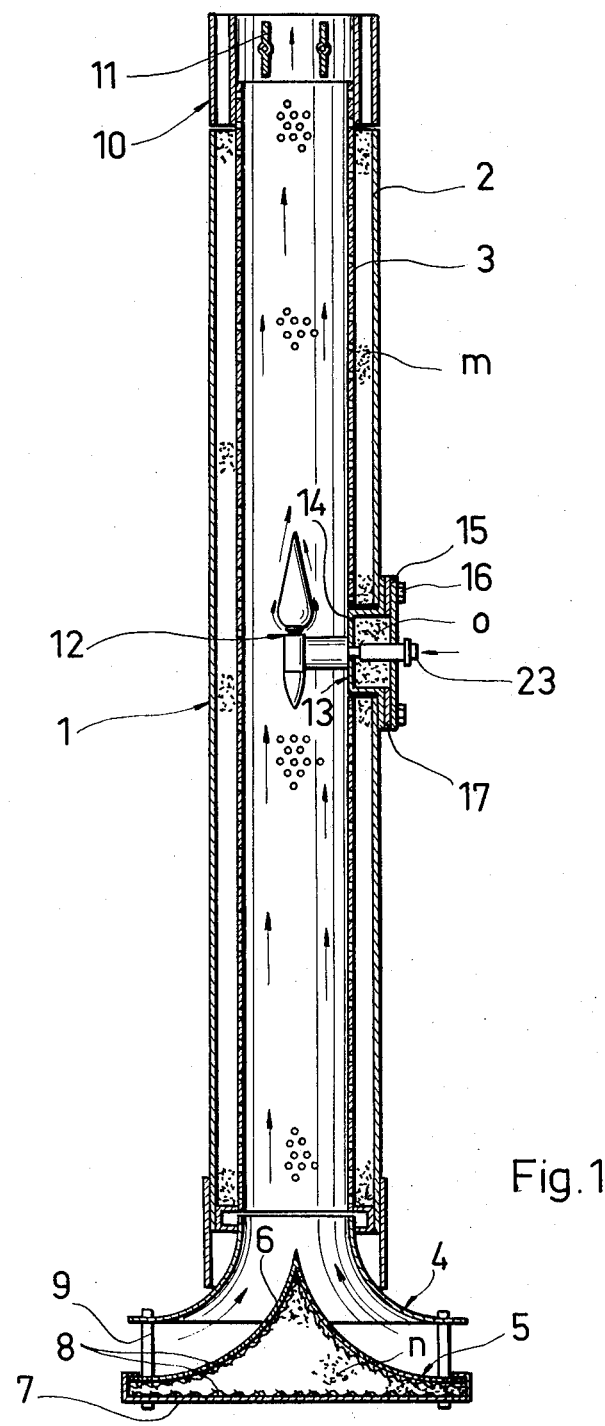
FIG. 1 is a longitudinal section A — A through the device.

The device according to the invention consists of tube 1, provided with an outer housing 2 made up of thin plate or of a sheet of plastic material and with an inner housing 3 of perforated thin plate. The space between housings 2 and 3 is filled with sound-absorbent material m. The inner housing 3 of perforated thin plate is connected at one end to a convergent air inlet 4 intended to improve the entrained air input.

In order to prevent the sound waves from the interior of tube 1 from escaping into the surrounding space, the inlet 4 for entrained air is provided with a screen 5 made up in its turn of a profiled surface 6 of perforated thin plate and of an outer wall 7 of thin plate.

The inner face of the profiled surface 6 and of the outer wall 7 is lined with a layer 8 of glass fibre, while the space left free between these elements is filled with sound-absorbent material, $n$, for instance glass wadding.

Screen 5 is fastened to air inlet 4 by means of rods 9.

The other end of tube 1 is introduced into an obturating device 10 provided with flaps 11, which remain open during operation and are closed once the room ventilation is ended.

In the interior of the tube 1 a Coanda ejector 12 of outer type is introduced, fastened on a support 13, consisting of a thin plate box 14 and a detachable wall 15, which is fastened to the outer housing 2 by screws 16. In order to avoid the propagation of the vibrations from ejector 12 to tube 1, the fastening of support 13 to the outer housing 2 is carried out by means of an elastic packing 17. The inside of thin plate box 14 is filled with a sound-absorbent material $n$.

The Coanda ejector of outer type 12 consists of a profiled body 18, provided at one of the ends with a micrometric thread on which a profiled piece 19 is screwed, and of a cylindrical body 20 fastened to a lenticular support 21.

The profiled body 18 is screwed into a cylindrical body 20 which also contains, at the same time, an annular feeding chamber c, serving for uniform distribution of the working fluid towards a slot f defined between by the frontal surfaces of the profiled body 18 and of the cylindrical body 20.

The width of slot $f$ may be adjusted according to the operating conditions, by rotating the profiled body 18 into the thread of cylindrical body 20, which leads to a relative axial displacement between profiled body 18 and cylindrical body 20.

On the threaded end of profiled body 18 an aerodynamically profiled piece 19 is screwed, which fulfils the function of a palnut, preventing any further relative displacement of profiled body 18 towards cylindrical body 20.

The cylindrical body 20 is fastened, for instance by welding, to a support 21 of lenticular profile (see FIG. 3) which at the other end is fastened to support 13 by screws 22.

The support of lenticular profile 21 is traversed by a channel $k$ intended to conduct the working fluid.

The support of lenticular profile 21 is also provided at one end with a threaded part on which a connection part 23 is screwed for the connection to the source of working fluid.

The operation of the device takes place as follows:

The primary fluid conveyed under pressure into chamber c traverses it axially, without returns or laminations, with minimal pressure losses, and escapes through a slot $f$, in form of a thin annular jet which adheres, due to the Coanda effect, to the outer surface of profiled body 18.

The fluid jet thus formed creates inside tube 1 a strong depression, resulting in the induction of a large quantity of entrained fluid by the air inlet 4. This fluid mass is evacuated through the obturation device 10, in open position through the rotation of flaps 11.

The present invention offers the following advantages:

it allows the entrainment of large masses of secondary fluid with minimal power consumption;

it achieves a superior efficiency as against the classical electrical ventilators in case of use of compressed air at low pressures and narrow slots (the advantage is obvious in case the steam is utilized as primary fluid owing to the achievement of larger ejection coefficients and to the fact that there are eliminated from the energy circuit, the turbine, electrical generator and the air compressor);

it presents constructive simplicity as compared to classical ejectors and is more profitable than the latter owing to the fact that it achieves superior ejection coefficients;

constructive simplicity;

the lack of moving parts grants the possibility of unlimited use;

it can also be utilized in corrosive and explosive media:

minimal gasodynamic losses in the primary fluid;

it allows operation over limited time periods with working fluid from a cylinder with compressed air in case of damage to the main air-feed system.

We claim:

1. A ventilating apparatus comprising an upright tube formed with a perforated inner wall, a layer of acoustical insulation surrounding said inner wall and an imperforate outer wall surrounding said layer of acoustical insulation; an external COANDA ejector disposed in said tube at an intermediate location there-along and comprising a support of lenticular cross-section extending laterally into said tube at said location and formed with a passage for feeding a primary fluid to said ejector, a cylindrical body fixed to said support and defining an annular chamber around an axis coinciding with the axis of said tube, a COANDA body of revolution spacedly juxtaposed with and mounted upon said cylindrical body to define an outwardly open annular slot communicating with said chamber, said body of revolution having an arcuate convex portion adjacent said slot and tapering upwardly away from said convex portion whereby fluid dispensed from said slot adheres to said body of revolution by the COANDA effect and induces a pressure drop at said location drawing air into said tube, the air being entrained through said tube by the COANDA flow along said body, and means for adjusting the width of said slot; flaps at the upper end of said tube for controlling the flow of air therethrough and an acoustic baffle at the lower end of said tube for admitting air laterally into the latter.

2. The apparatus defined in claim 1 wherein said COANDA ejector includes a thread on said cylindrical body, said body of revolution being threadedly engaged with said cylindrical body and said ejector further includes a profiled piece for securing said body of revolution in a predetermined position relative to said cylindrical body.

* * * * *